(12) United States Patent
McTighe et al.

(10) Patent No.: US 6,308,719 B1
(45) Date of Patent: Oct. 30, 2001

(54) PRE-CLEAN DELUGE SYSTEM

(75) Inventors: John McTighe, Dublin; Derek Heath, Marysville; Jeff McKinley, Huntsville; Shawn Guthrie, Springfield; Gene Hunt, Bellefontaine, all of OH (US)

(73) Assignee: Honda of America Manufacturing, Inc., Marysville, OH (US)

( * ) Notice: Subject to any disclaimer, the term of this patent is extended or adjusted under 35 U.S.C. 154(b) by 0 days.

(21) Appl. No.: 09/538,081

(22) Filed: Mar. 29, 2000

(51) Int. Cl.[7] ............................... B08B 3/02; B08B 9/00; C23G 1/36
(52) U.S. Cl. ............................... 134/10; 134/23; 134/24; 134/25.4; 134/26; 134/32; 134/42; 134/73; 134/76; 134/111
(58) Field of Search ............................... 134/10, 23, 24, 134/25.4, 26, 32, 42, 73, 76, 111; 118/72, 73; 427/299, 327

(56) References Cited

U.S. PATENT DOCUMENTS 3,839,988 * 10/1974 Düerr ............................... 118/7
4,402,765 * 9/1983 Goto et al. ............................... 148/6.15 R
5,428,880 * 7/1995 Tomioka et al. ............................... 29/458

OTHER PUBLICATIONS

GM NAO Manufacturing Center Paint Engineering, Best Practices, Weld Ball and Metal Control, Rev. Oct. 13, 1997, pp. 1–16.

* cited by examiner

*Primary Examiner*—Zeinab El-Arini
(74) *Attorney, Agent, or Firm*—Rankin, Hill, Porter, & Clark LLP

(57) ABSTRACT

A pre-clean deluge system for cleaning automobile white bodies including a cleaning solution filtration and distribution system. The filtration system includes a series of filters specially adapted to remove metal particles from the cleaning solution. The distribution system includes deluge cannons that are position so as to deliver cleaning solution to the interior of the white body in a location during the white body travel so that the particles flushed therefrom are introduced into a small tank prior to a main tank in which the white body is subsequently immersed. The distribution system also provides regulated flow of cleaning solution to the deluge cannons, as well as a bypass to facilitate cycling of cleaning solution for end-of-shift filtration purposes.

2 Claims, 1 Drawing Sheet

PRE-CLEAN DELUGE SYSTEM

BACKGROUND OF THE INVENTION

1. Field of the Invention

The present invention is directed toward automobile manufacturing processes and, more particularly, toward a method and apparatus for pre-cleaning an automobile body prior to a painting process.

2. Description of Related Art

During the manufacture of automobiles, and before the automobile is painted, the body panels are welded, bolted, or otherwise installed on the automobile frame. Typically, all of the metal body panels, including the fenders, hood, trunk lid and doors, are secured to the frame. This structural assembly is referred to in the field and hereinafter as the "white body".

Before being painted, the white body must be cleaned to remove oil, grease, and residual metal that would result in a flaw in the finished paint surface. The residual metal, which is especially difficult to remove, include the by-products of welding, such as welding balls and metal particles. Accordingly, there has been much attention to the efficient and economical cleaning of the white body.

It is known in the art to clean the white body by means of a deluge cleaning system wherein the automobile is initially flooded with a cleaning solution, typically water, at least partially immersed in a cleaning bath containing the cleaning solution, and then flooded again with cleaning solution. One or more spray bars may also be used to spray cleaning solution onto the exterior surfaces of the white body, both before and after immersion in the cleaning solution bath, to rinse the white body.

The prior art inlet deluge cannon is disposed over the cleaning bath. Accordingly, initial flooding of the white body takes place at the entrance of the cleaning solution bath, typically at the upstream side, and is accomplished by means of a series of deluge nozzles. The deluge nozzles flood the white body interior, via one of more window openings, with cleaning solution. The flow of cleaning solution liberates metal particles, such as welding balls, from the white body interior. The used cleaning solution flows from the white body, together with entrained particles, and into the cleaning solution bath.

Subsequent immersion of the white body in the cleaning solution bath releases further metal particles into the cleaning solution bath. Moreover, the second flooding of the white body via second deluge nozzles essentially rinses any remaining particles from the white body into the cleaning solution bath.

The cleaning solution bath is defined by a container or tank holding a large volume of cleaning solution. The container has a bottom drain by means of which cleaning solution and particles exit the container and are delivered to a filtration and fluid distribution system. The prior art filtration and fluid distribution system takes cleaning solution and entrained particles from the cleaning solution bath, separates or filters the particles therefrom, and provides the filtered cleaning solution, pressurized by means of pumps, back to the deluge nozzles and/or spray bars of the deluge cleaning system.

As can be appreciated from the foregoing, due to the nature of the material being removed from the white bodies and subsequently removed from the cleaning solution bath, the deluge cleaning systems known in the art are under considerable operational stress and suffer from several significant drawbacks.

Although the particles deposited on the white bodies come in different densities, sizes, and shapes, they can generally be classified into a first group that sinks and a second group that floats. The group of particles that sink have a tendency to accumulate along the bottom surface of the tank, and forces the tank to be cleaned frequently. The group of particles that float have a tendency to accumulate at, or just under, the upper surface of the cleaning solution bath, and present a significant problem in the system. Namely, the floating particles have a tendency to be redeposited on the surface of subsequently submerged or immersed white bodies. The more white bodies that are processed, the more of a problem that these two groups of particles present.

As the filtration system becomes loaded with filtered particles, there is a tendency for the rate of cleaning solution flow through the deluge nozzles into the interior of the white body to drop. Accordingly, the fluid pressure and rate of flow at the deluge nozzles varies from high levels when the filters are clean to relatively low levels when the filters are clogged. Unfortunately, high pressure/flow may result in damage to the white body, typically to the weld sealer. Low pressure/flow may provide inadequate cleaning of the white body. Also, variations in the flow rate and pressure of the cleaning solution yields inconsistent results, which is undesirable.

Accordingly, there exists a need in the art for a method and device for eliminating or reducing the problems associated with metal particles in the cleaning solution bath. There also exists a need in the art for a device and method for supplying a relatively constant volume of cleaning solution to the deluge nozzles of the deluge cleaning system. Finally, there exists a need in the art for an improved system wherein cycling of the cleaning solution is improved.

SUMMARY OF THE INVENTION

The present invention is directed toward a method and device for reducing the problems associated with floating and sinking particles in a cleaning solution bath of a preclean deluge system. The present invention is also directed toward a deluge cleaning system that is adapted to provide a relatively constant volume of cleaning solution to the water cannons. The present invention is further directed toward a deluge cleaning system that has an improved flow system to facilitate cycling of cleaning solution for end of shift filtering purposes.

The present invention is directed toward a method and device for filtering cleaning solution, and for deluge cleaning of white bodies wherein, in addition to the cleaning solution tank, an additional small weir tank is provided at the inlet or upstream side of the cleaning solution tank. The weir tank is disposed at a position relative to a first deluge cannon so that cleaning solution and entrained particles flowing from the white body prior to immersion can be introduced into the weir tank.

The present invention is further directed toward a method and device for cycling cleaning solution so that filtering during and at the end of a shift or during assembly line stoppage can be performed efficiently and quickly. In accordance with the present invention, such cycling is accomplished by actuation of a three way valve to a position in which cleaning solution bypasses the deluge cannons and flow regulation means associated therewith, and instead returns directly to the cleaning solution tank.

The present invention is further directed toward a system wherein cleaning solution flows from the deluge cannons at a relatively constant rate and pressure. In accordance with the present invention, a flow regulating means is provided upstream of the deluge cannons and maintains the flow rate and pressure at a predetermined setting.

BRIEF DESCRIPTION OF THE DRAWINGS

These and further features of the present invention will be apparent with reference to the following description and drawing, wherein.

DETAILED DESCRIPTION OF THE PREFERRED EMBODIMENT

Figure 1:
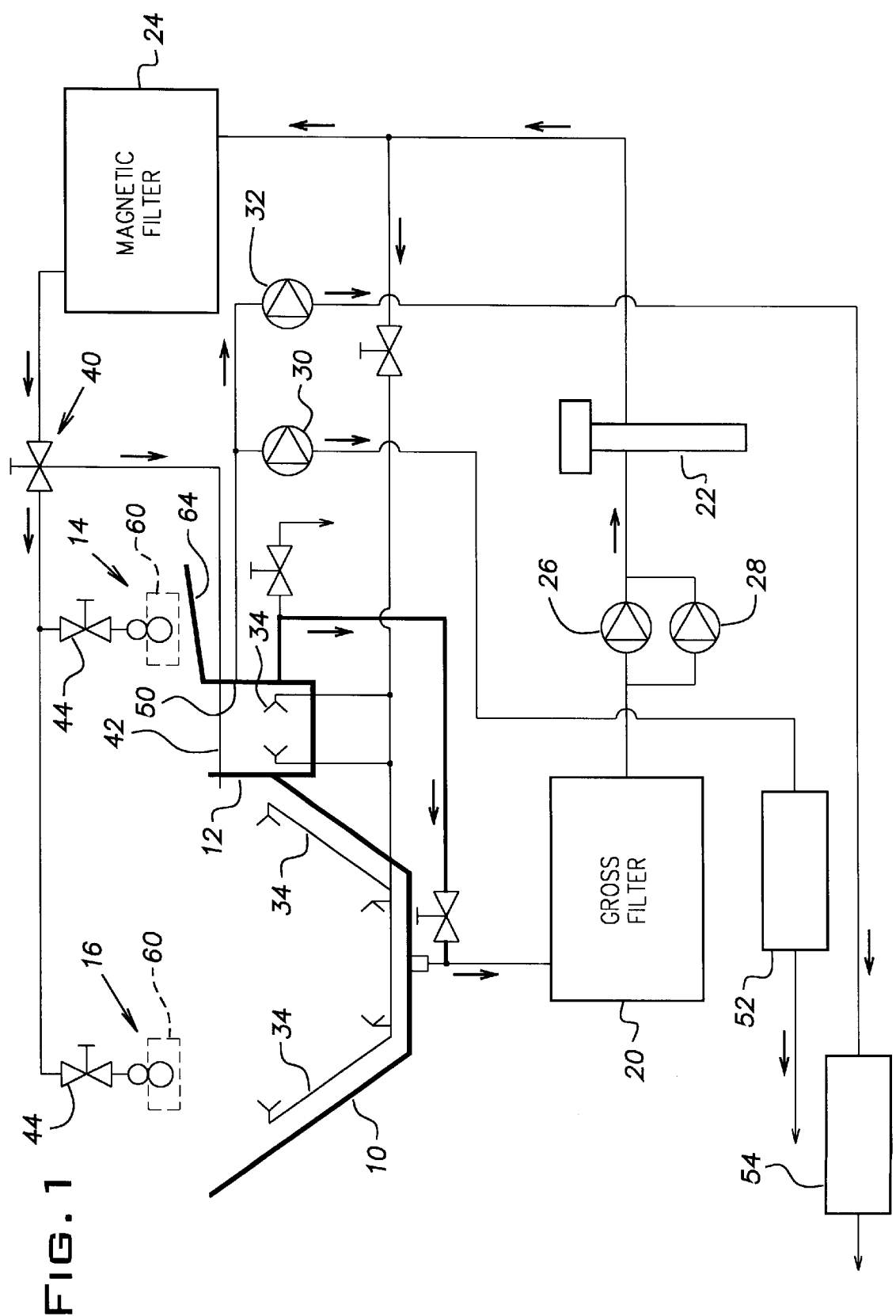
FIG. 1 schematically illustrates the cleaning solution filtration and distribution system according to the present invention.

With reference to FIG. 1, the pre-clean deluge system according to the present invention includes a cleaning solution filtration and distribution system. The filtration and distribution system includes a main cleaning solution tank 10, an associated weir tank 12, an inlet deluge cannon 14, an outlet deluge cannon 16, a series of spray bars (not shown), and a series of filters 20, 22, 24 and pumps 26, 28, 30, 32.

The filters include a gross filter 20, a centrifugal separator 22, and magnetic filter assemblies 24. The gross filter 20 is preferably provided by a mesh basket strainer and, more preferably, by a pair of parallel-connected mesh basket strainers. The gross filter receives cleaning solution and entrained particles from the main tank 10 and weir tank 12 and removes the largest and heaviest particles from the cleaning solution flow.

The centrifugal separator 22 exploits the principle that, when a fluid is caused to flow in a circular or spiral path, particles entrained in the fluid will be forced to the outside of the circle or spiral path, and the center portion of the path will be relatively free of particles. The particles then settle to a bottom of the centrifugal separator 22 and can be periodically purged from the system, preferably in an automated fashion. A satisfactory centrifugal separator known as a Lakos separator is commercially available from The Claude Laval Corporation of 1365 North Clovis Avenue, Fresno, Calif. A single centrifugal separator has been used with success by the applicants.

Magnetic filter bag assemblies 24 are the final filtration step. Each magnetic filter bag assembly 24 preferably includes a vessel containing a plurality of small-mesh bags that hold a quantity of magnets. The magnets are effective at attracting and retaining any remaining metal particles that flow past the magnetic filter assemblies. Due to the nature of the particles and the tendency of the magnetic filter bags to become clogged or covered with filtered metal particles, a plurality of parallel-connected filter assemblies are preferred. For example, an array of three filter assemblies, each having six 50-micron mesh bags holding 7500 Gauss magnets has been used with success by the applicants.

The pump system is adapted to deliver at least about 2000 gallons per minute to the entire deluge system. At least about 1000 gallons per minute is delivered to the deluge cannons 14, 16, while the remaining flow is directed to a series of spray bars and eductor nozzles 34, as will be described hereinafter. The pump system includes a pair of primary pumps 26, 28 and a pair of secondary pumps 30, 32. The primary pumps supply fluid to a primary cleaning system, and are disposed between the outlet of the gross filter 20 and the inlet of the centrifugal separator 22. Preferably, the primary pumps 26, 28 are connected in parallel and are operable both simultaneously and independently. Typically, both primary pumps 26, 28 will be continuously operated.

Downstream of the centrifugal separator 22, the cleaning solution flow is separated. A minor portion of the cleaning solution flow is directed to the eductor nozzles 34, to be described hereinafter. The major portion of the cleaning solution flow is directed to the magnetic filter assemblies 24.

Downstream the magnetic filter assemblies 24, the cleaning solution flow is directed toward the cleaning solution tank 10, 12. More specifically, via a three-way valve 40, the cleaning solution is either returned to the tank 10, 12 via the deluge cannons 14, 16 or, via a bypass conduit 42 that avoids the deluge cannons 14, 16, directly into the tank. As will be discussed more fully hereinafter, during normal operation the three-way valve is positioned so that cleaning solution is delivered to the deluge cannons 14, 16. However, when the cleaning solution is to be cycled, such as may happen at the end of a shift or during stoppage of the assembly line, the valve can be put in its secondary position wherein cleaning solution is delivered directly to the tank 10, 12. As will be apparent, placing the valve in its secondary position reduces back-pressure on the primary pumps 26, 28 and permits the cleaning solution to circulate more quickly through the system to facilitate more rapid filtration thereof.

Downstream the three-way valve 40, the deluge cannons 14, 16 are provided with one or more flow regulating valves 44 whereby the flow rate and/or pressure of the cleaning solution is regulated and maintained at a desired value. Such regulation of flow is desirable as it prevents damage and poor cleaning associated with over-pressure, and provides more consistent results. Preferably, a single flow regulating valve 44 is used to control the flow through all the deluge cannons 14, 16. A flow regulating valve that has been used with success by the applicants is commercially available from CLA-VAL of 1701 Placentia Avenue, Costa Mesa, Calif.

A secondary cleaning system is also provided wherein cleaning solution, pressurized via the secondary pumps 30, 32, is delivered to a series of spray bars (not shown). The secondary cleaning solution delivery system includes, in addition to the secondary pumps 30, 32, an inlet 50, filters 52, 54, and first and second arrays of spray bars (not shown). Typically, the first array of spray bars is at the upstream side of the main tank and sprays cleaning solution onto the exterior of the white body prior to immersion thereof in the main tank. The second array of spray bars is on the downstream side of the main tank and sprays cleaning solution onto the exterior of the white body after removal thereof from the main tank.

The inlet 50 to the secondary cleaning solution system is at a mid-level position on the weir tank 12 wherein the cleaning solution is relatively free of particles. The cleaning solution is delivered to the pair of secondary pumps 30, 32, which are each associated with one of the first and second spray bar arrays. Between the pumps and the spray bars are provided the filters 52, 54, in the form of magnetic filter assemblies, to remove small particles from the cleaning solution.

The cleaning solution tank, which is shown in highly schematic form in FIG. 1, includes the main tank 10 and the weir tank 12. Each of the main tank 10 and the weir tank 12 has at least one drain and a series of eductor nozzles. The eductor nozzles are preferably disposed in a pattern along the bottom surface of the tanks 10, 12 and direct a flow of cleaning solution along the bottom surface of the tanks 10, 12 toward the tank drain. The flow of cleaning solution establishes a current along the tank 10, 12 bottom that sweeps particles, especially submerged metal particles, toward the tank drain. Accordingly, the present invention keeps the bottoms of the tanks 10, 12 relatively clean and reduces the frequency of required tank draining for maintenance and cleaning.

As the white bodies are transported by a movable assembly toward, through, and out of the main tank 10, the orientation of the white bodies may change. In some applications, the white bodies are initially generally horizontal, and then have their leading end tipped downwardly as they are lowered toward the cleaning solution. The white bodies then return to the horizontal or normal orientation as they are immersed in and travel through the cleaning solution. Then, the leading end is tipped upwardly as the white body is lifted out of the tank, after which the white body is returned to the normal, horizontal orientation.

The white bodies 60 travel from right to left in FIG. 1. Upstream the weir tank 2 is provided a ramping inlet surface 64 above which the white bodies move toward the main tank 10 The inlet deluge cannons 14 are preferably disposed over the ramping inlet surface 64 and inject or flood the white bodies with cleaning solution. The cleaning solution and entrained particles flows from the white bodies and into the weir tank 12, it being noted that the white bodies arc continuously moving while the deluge cannons 14, 16 preferably remain stationary. Moreover, as the white bodies 60 approach the weir tank 12, the white bodies are lowered and may be tilted downwardly for immersion in the main cleaning tank. Downward tilting for subsequent immersion furthers the flow or draining of cleaning solution and particles from the white bodies 60 into the weir tank 12.

Accordingly, due to the position of the weir tank 12 and, more specifically, the relative locations of the weir tank 12 and the inlet deluge cannon 14, the provision of cleaning solution prior to immersion, which is at a rate of between about 600–800 gallons per minute, causes a large amount of metal and particulate material is removed from the white body 60 and delivered into the weir tank 12. The heavier particles sink to the bottom of the weir tank 12. The lighter particles still float in the weir tank 12, but are not present in the main tank 10 in which the white bodies 60 are submerged. Therefore, the quantity of floating particles in the main tank is relatively less, as compared with the prior art, and there is less tendency for re-deposition of particles on the white bodies during immersion in the main tank. It is further noted that, even if the level of cleaning solution in the main and weir tanks is such that the cleaning solution forms a single continuous body of liquid, the introduction of the metal particles into the weir tank 12 will, nevertheless, help keep the main tank 10 relatively free of metal particles, especially submerged metal particles.

While the preferred embodiment of the present invention is shown and described herein, it is to be understood that the same is not so limited but shall cover and include any and all modifications thereof which fall within the purview of the invention.

What is claimed is:

1. A method for cleaning a vehicle white body, said white body being transported by a movable assembly toward and away from a cleaning solution tank, said cleaning solution tank including a main tank and a weir tank, said weir tank being located upstream said main tank, each of said main tank and said weir tank holding a volume of cleaning solution and including an outlet from which cleaning solution flows into a filtration system, said filtration system providing filtered cleaning solution, via at least one deluge cannon, for injected into an interior of said white body, said method comprising the steps of:

providing said at least one deluge cannon at a location such that, after said cleaning solution is injected into said white body interior via said at least one deluge cannon, said cleaning solution and particles derived from said white body interior flow into said weir tank;

moving said white body via said movable assembly over said weir tank and toward said main tank;

draining cleaning solution and particles from said cleaning solution tank;

filtering particles from said cleaning solution to provide filtered cleaning solution;

pumping said filtered cleaning solution to said at least one deluge cannon and injecting said filtered cleaning solution into the interior of said white body;

lowering and immersing said white body in said main tank; and, raising and withdrawing said white body from said main tank.

2. The method for cleaning a vehicle white body according to claim 1, comprising the further step of:

regulating flow of filtered cleaning solution through said at least one deluge cannon.

\* \* \* \* \*